(12) United States Patent
Okuyama et al.

(10) Patent No.: US 7,708,103 B2
(45) Date of Patent: May 4, 2010

(54) POWER UNIT SUPPORT STRUCTURE

(75) Inventors: Hiroshi Okuyama, Saitama (JP); Kazuo Yamamoto, Saitama (JP); Masashi Koyanagi, Saitama (JP); Hiroaki Kase, Saitama (JP); Takeshi Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 911 days.

(21) Appl. No.: 11/492,846

(22) Filed: Jul. 26, 2006

(65) Prior Publication Data

US 2007/0023221 A1 Feb. 1, 2007

(30) Foreign Application Priority Data

Jul. 29, 2005 (JP) ............................. 2005-222276

(51) Int. Cl.
*B60K 5/02* (2006.01)

(52) U.S. Cl. ...................................... 180/299; 180/291

(58) Field of Classification Search ................. 280/291, 280/299, 300; 296/203.1, 204, 205; 180/291, 180/299, 300

See application file for complete search history.

(56) References Cited

U.S. PATENT DOCUMENTS

| | | | | |
|---|---|---|---|---|
| 5,630,575 A | * | 5/1997 | Koyanagi et al. | 267/140.3 |
| 5,740,876 A | * | 4/1998 | Shimose et al. | 180/232 |
| 6,085,858 A | * | 7/2000 | Wakana et al. | 180/300 |
| 6,109,654 A | * | 8/2000 | Yamamoto et al. | 280/784 |
| 6,298,936 B1 | * | 10/2001 | Yoshida | 180/232 |
| 6,604,600 B2 | * | 8/2003 | Fournier et al. | 180/299 |
| 6,708,793 B2 | * | 3/2004 | Witherspoon et al. | 180/291 |
| 7,575,087 B2 | * | 8/2009 | Kim | 180/299 |

FOREIGN PATENT DOCUMENTS

JP 3522834 B2 2/2004

* cited by examiner

*Primary Examiner*—Glenn Dayoan
*Assistant Examiner*—John D Walters
(74) *Attorney, Agent, or Firm*—Birch, Stewart, Kolasch & Birch, LLP (57) ABSTRACT

A power unit support structure to minimize vibration of a vehicle body frame. A mount bracket disposed on a vehicle body frame supports a power unit that includes a longitudinal engine. Specifically, the mount bracket is disposed substantially at a center in a vehicle width direction between a pair of right and left center side frames that form part of the vehicle body frame and extend in a vehicle fore-aft direction. The center side frames are connected together with cross members. The mount bracket is mounted to the cross members via a connection member as a vibration damping material. The power unit is then mounted to the mount bracket via a sub-frame.

13 Claims, 9 Drawing Sheets

FIG. 9(a) MODIFIED EXAMPLE

FIG. 9(b) WORKING EXAMPLE

POWER UNIT SUPPORT STRUCTURE

CROSS-REFERENCE TO RELATED APPLICATION

The present application claims priority under 35 U.S.C. §119 to Japanese Patent Application No. 2005-222276, filed Jul. 29, 2005, the entire contents of which are hereby incorporated by reference.

BACKGROUND OF THE INVENTION

1. Field of the Invention

The present invention relates to an improved power unit support structure.

2. Description of Background Art

A known support structure for a vehicle drive source uses rubber mount apparatuses on the right and left sides of a vehicle frame to attach an engine thereon (see, for example, Japanese Patent No. 3522834)

FIG. 2 of Japanese Patent No. 3522834 shows that support brackets 2f, 2r are mounted on a right and left side of a vehicle body frame F, respectively, and a lower portion of an engine E is attached to the support brackets 2f, 2r via rubber mount apparatuses ML, MR.

Rotational vibration is generated in the engine E because of torque fluctuations occurring from rotation of a crankshaft. Displacement of the rotational vibration of the engine E becomes greater at greater distances from a center of the rotational vibration. The support brackets 2f, 2r displace greatly at a location far away from the center of the rotational vibration (e.g., a center of gravity of the engine E). This results in the vehicle body frame F being largely vibrated.

SUMMARY AND OBJECTS OF THE INVENTION

It is an object of the present invention to improve the power unit support structure, thereby helping make vibration of the vehicle body frame even smaller.

To achieve the foregoing object, in accordance with a first aspect of the present invention, there is provided a power unit support structure having a support bracket disposed on a vehicle body frame, the support bracket supporting a power unit including a longitudinal engine. The power unit support structure according to the first aspect of the present invention is characterized in that the support bracket is disposed substantially at a center in a vehicle width direction between a pair of right and left main frames forming part of the vehicle body frame and extending in a vehicle fore and aft direction. The power unit support structure according to the first aspect of the present invention is further characterized in that the right and left main frames are connected with a cross member, the support bracket is mounted to the cross member via a vibration damping material, and the power unit is mounted to the support bracket via a power unit support subframe.

The support bracket, being disposed at the center in the vehicle width direction between the pair of right and left main frames, allows the power unit to be supported substantially at a center of the power unit with the support bracket when the power unit is disposed between the pair of right and left main frames. Accordingly, the support bracket is located near a center of rotational vibration of the power unit. The support bracket is therefore able to support the power unit at a location of small displacement. This helps prevent vibration from being transmitted from the power unit to the vehicle body frame.

Use of the support bracket for supporting the power unit support subframe, on which the power unit is mounted, allows the power unit to be disposed easily substantially at the center in the vehicle width direction.

In addition, if the power unit is supported by the main frame via the support bracket, the degree of freedom in design of the support bracket is restricted by the size of the power unit and position of the main frame. Use of the power unit support subframe, however, minimizes these restrictions, thus increasing the degree of freedom in design of the support bracket. Moreover, vibration, which could otherwise be transmitted from the power unit support subframe to the right and left main frames, is absorbed by a rubber.

In accordance with a second aspect of the present invention, there is provided a power unit support structure having a support bracket disposed on a vehicle body frame, the support bracket supporting a power unit including a longitudinal engine. The power unit support structure according to the second aspect of the present invention is characterized in that the support bracket is disposed between a pair of right and left main frames forming part of the vehicle body frame and extending in a vehicle fore and aft direction, the support bracket is disposed at front and rear of the vehicle body, and a center of gravity of the power unit is disposed at a point near a line connecting the two support brackets at the front and rear.

The support brackets, being disposed between the pair of right and left main frames and at locations near the center of gravity of the power unit, helps make the distance small between the center of gravity and each of the support brackets when, for example, the power unit rotationally vibrates about the center of gravity. This allows the support brackets to support the power unit at a location with a small displacement.

In accordance with a third aspect of the present invention, the support bracket is mounted to a side of the power unit via a vibration damping material.

The vibration damping material can absorb vibration that would otherwise be transmitted from the power unit to the side of the main frames.

In accordance with a fourth aspect of the present invention, the power unit support subframe is supported on the vehicle body only in the vehicle fore and aft direction.

Supporting the power unit support subframe on the vehicle body side only in the vehicle fore and aft direction enables effective absorption of rotational vibration generated by the longitudinal engine about an axis extending in the vehicle fore and aft direction.

In accordance with a fifth aspect of the present invention, a power unit support portion supporting the power unit is disposed at a position offset in a height direction relative to the support bracket.

This allows the power unit support portion to receive a torque reaction force of the power unit.

In accordance with a sixth aspect of the present invention, the support bracket is mounted to the power unit support subframe via an extension portion.

The extension portion makes it possible to mount the support bracket at a position on the power unit support subframe, at which the support bracket does not interfere with the power unit.

In accordance with the first aspect of the present invention, the support bracket is disposed substantially at the center in the vehicle width direction between the pair of right and left main frames forming part of the vehicle body frame and extending in the vehicle fore and aft direction. Further, the right and left main frames are connected with the cross member, the support bracket is mounted to the cross member via the vibration damping material, and the power unit is mounted to the support bracket via the power unit support subframe. Accordingly, the support bracket can be disposed at a place near the center of rotational vibration of the power unit. The power unit can therefore be supported at a location with a small displacement of the power unit. Vibration transmitted from the power unit to the vehicle body frame can thereby be minimized even further.

The power unit support subframe allows the power unit to be disposed easily substantially at the center in the vehicle width direction. The power unit can thereby be supported at the location with a small displacement, thus minimizing vibration of the vehicle body frame.

Further, the use of the power unit support subframe helps reduce restrictions imposed by the power unit size and main frame position. This enhances the degree of freedom in design of the support bracket. In addition, the rubber absorbs vibration transmitted from the power unit support subframe to the right and left main frames.

In accordance with the second aspect of the present invention, the support bracket is disposed between the pair of right and left main frames forming part of the vehicle body frame and extending in the vehicle fore and aft direction, the support bracket is disposed at front and rear of the vehicle body, and a center of gravity of the power unit is disposed at a point near a line connecting the two support brackets at the front and rear. The support brackets can therefore disposed at positions even closer to the center of rotational vibration of the power unit. The power unit can thus be supported at a location with a small displacement of power unit rotational vibration. Vibration of the vehicle body frame can thereby be even further minimized.

In accordance with the third aspect of the present invention, the support bracket is mounted to the side of the power unit via the vibration damping material. The vibration damping material can absorb vibration that would otherwise be transmitted from the power unit to the side of the main frames. Vibration of the vehicle body frame can thereby be even further minimized.

In accordance with the fourth aspect of the present invention, the power unit support subframe is supported on the vehicle body only in the vehicle fore and aft direction. Rotational vibration generated by the longitudinal engine about the axis extending in the vehicle fore and aft direction can be effectively absorbed.

In accordance with the fifth aspect of the present invention, the power unit support portion supporting the power unit is disposed at the position offset in the height direction relative to the support bracket. This allows the power unit support portion to receive a torque reaction force of the power unit. Power unit support stiffness can thereby be enhanced.

In accordance with the sixth aspect of the present invention, the support bracket is mounted to the power unit support subframe via the extension portion. The extension portion makes it possible to mount the support bracket at a position on the power unit support subframe, at which the support bracket does not interfere with the power unit. This enhances assemblability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
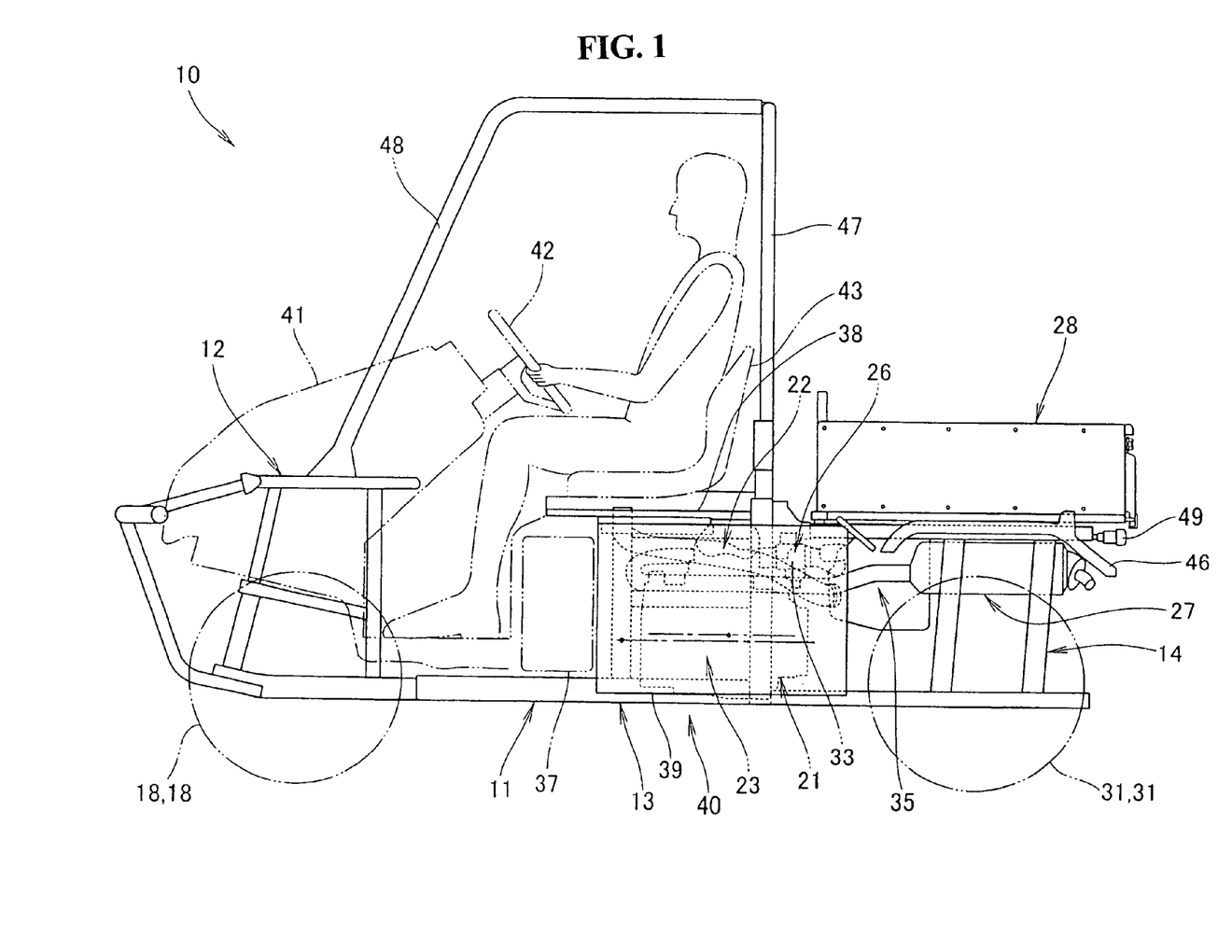
FIG. 1 is a side elevational view showing a vehicle having a power unit support structure according to a preferred embodiment of the present invention.

FIG. 1 is a side elevational view showing a vehicle having a power unit support structure according to a preferred embodiment of the present invention. A vehicle 10 is a two-seated, four-wheel-drive vehicle including a vehicle body frame 11, right and left front wheels 18, 18, a power unit 21, an intake system 26, and an exhaust system 27, a cargo deck 28, and right and left rear wheels 31, 31. The vehicle body frame 11 includes a front frame 12, a center frame 13, and a rear frame 14. The power unit 21 including an engine 22 and a transmission 23 is mounted on the center frame 13 and the rear frame 14. The intake system 26, disposed rearward of the engine 22, supplies the engine 22 with air and fuel. The exhaust system 27 is extended rearwardly from a front portion of the engine 22. The cargo deck 28 is tiltably mounted on an upper portion of the rear frame 14.

The intake system 26 includes a throttle body 33 and an air cleaner 35. The throttle body 33 is connected to the engine 22. The air cleaner 35 is connected to the throttle body 33.

The engine 22 of the power unit 21 has a crankshaft (not shown) extending longitudinally along a fore and aft direction of the vehicle body. Specifically, the engine 22 is a longitudinal type.

FIG. 1 also illustrates a fuel tank 37, an upper side bulkhead 38 that divides the side of the power unit 21 from the side of the cabin, and a pair of right and left side bulkheads 39 (only reference numeral 39 representing the side bulkhead on a proximal side is shown) that divide the side of the power unit 21 from a corresponding right or left side edge portion of the vehicle body. Also shown are an engine compartment 40 surrounded by the fuel tank 37, the upper side bulkhead 38, the right and left side bulkheads 39, 39, a front cover 41, a steering wheel 42, right and left seats 43, 44 (only reference numeral 43 representing the seat on a proximal side is shown) attached to the center frame 13. Reference numerals 46, 46 represent rear fenders (only reference numeral 46 representing the rear fender on a proximal side is shown), right and left roll bars 47, 47 (only reference numeral 47 representing the roll bar on a proximal side is shown) erected on the center frame 13, upper frames 48, 48 (only reference numeral 48 representing the upper frame on a proximal side is shown) placed across the front frame 12 and the roll bars 47, 47, and tail lamps 49, 49 (only reference numeral 49 representing the tail lamp on a proximal side is shown).

Figure 2:
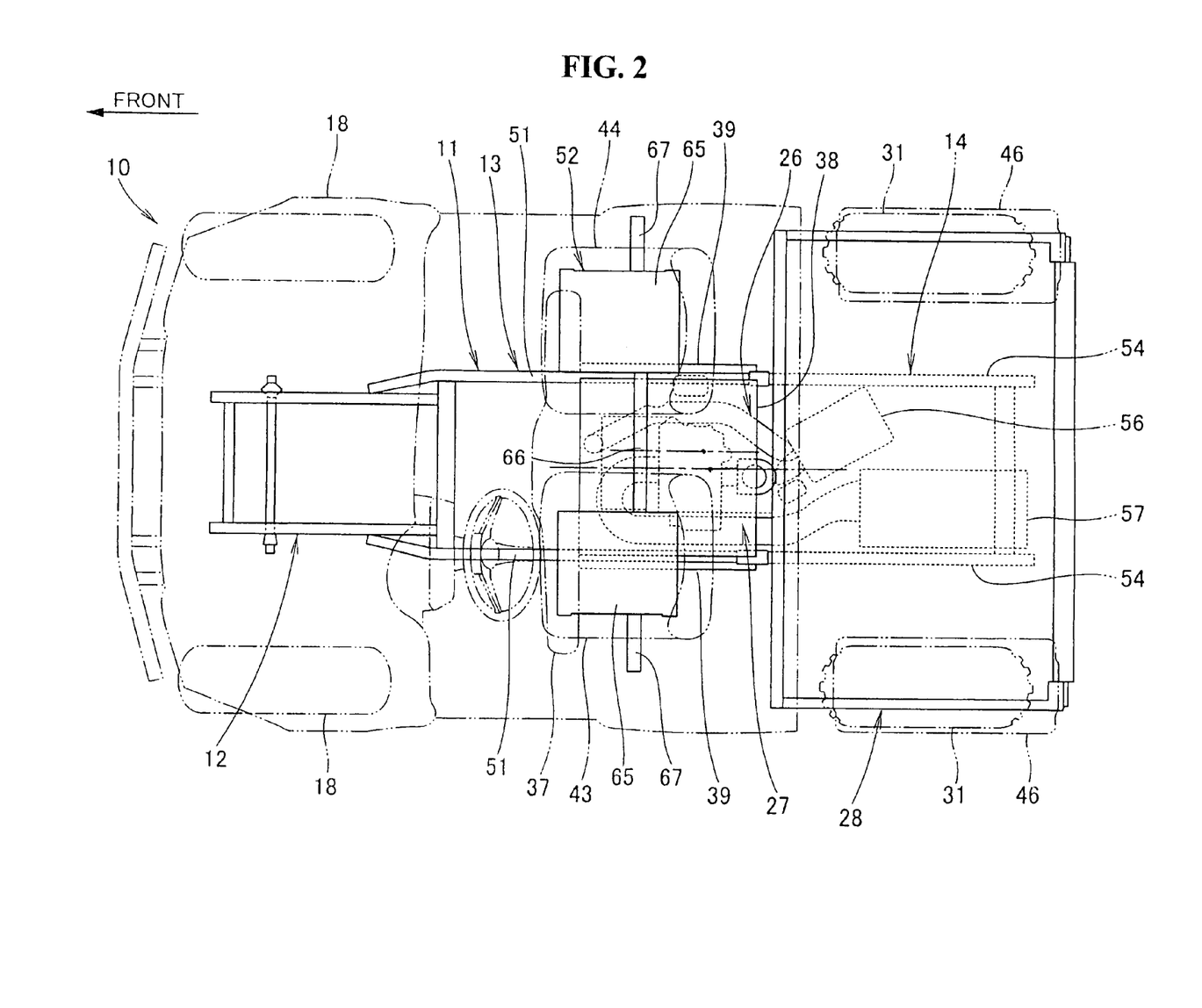
FIG. 2 is a plan view showing the vehicle according to the preferred embodiment of the present invention.

FIG. 2 is a plan view (an arrow marked with FRONT in FIG. 2 points toward a forward direction of the vehicle; the same applies hereunder) showing the vehicle 10 according to the preferred embodiment of the present invention. FIG. 2 shows that the vehicle 10 has the following arrangements. Specifically, the center frame 13 of the vehicle body frame 11 includes a pair of right and left center side frames 51, 51. A seat frame member 52 is mounted to the center side frames 51, 51. The seats 43, 44 are then mounted on the seat frame member 52. In addition, the rear frame 14 of the vehicle body frame 11 includes a pair of right and left rear side frames 54, 54. An air cleaner main body 56 forming the intake system 26 and a muffler 57 forming the exhaust system 27 are disposed between the rear side frames 54, 54 in a plan view.

The seat frame member 52 includes seat support plates 65, 65, a connection frame 66, and the portion frames 67. The seat support plates 65, 65 support the seats 43, 44. The connection frame 66 connects the seat support plates 65, 65. The side portion frame 67 protrudes sideways from each of the seat support plates 65, 65. The side portion frames 67 support armrests (not shown) with a front portion of the cargo deck 28.

The rear frame 14 formed from the pair of right and left rear side frames 54, 54, on which the cargo deck 28 is mounted.

The fuel tank 37 is disposed so as to extend downward of the seats 43, 44 and in a vehicle width direction.

The upper side bulkhead 38 is adapted to have a width in a crosswise direction of the vehicle body substantially equivalent to a distance between the right and left center side frames 51, 51. Further, the upper side bulkhead 38 is adapted to have a length in the fore and aft direction that substantially covers the power unit 21 in a plan view. The side bulkheads 39, 39 are disposed substantially along each side faces of the center side frames 51, 51.

Figure 3:
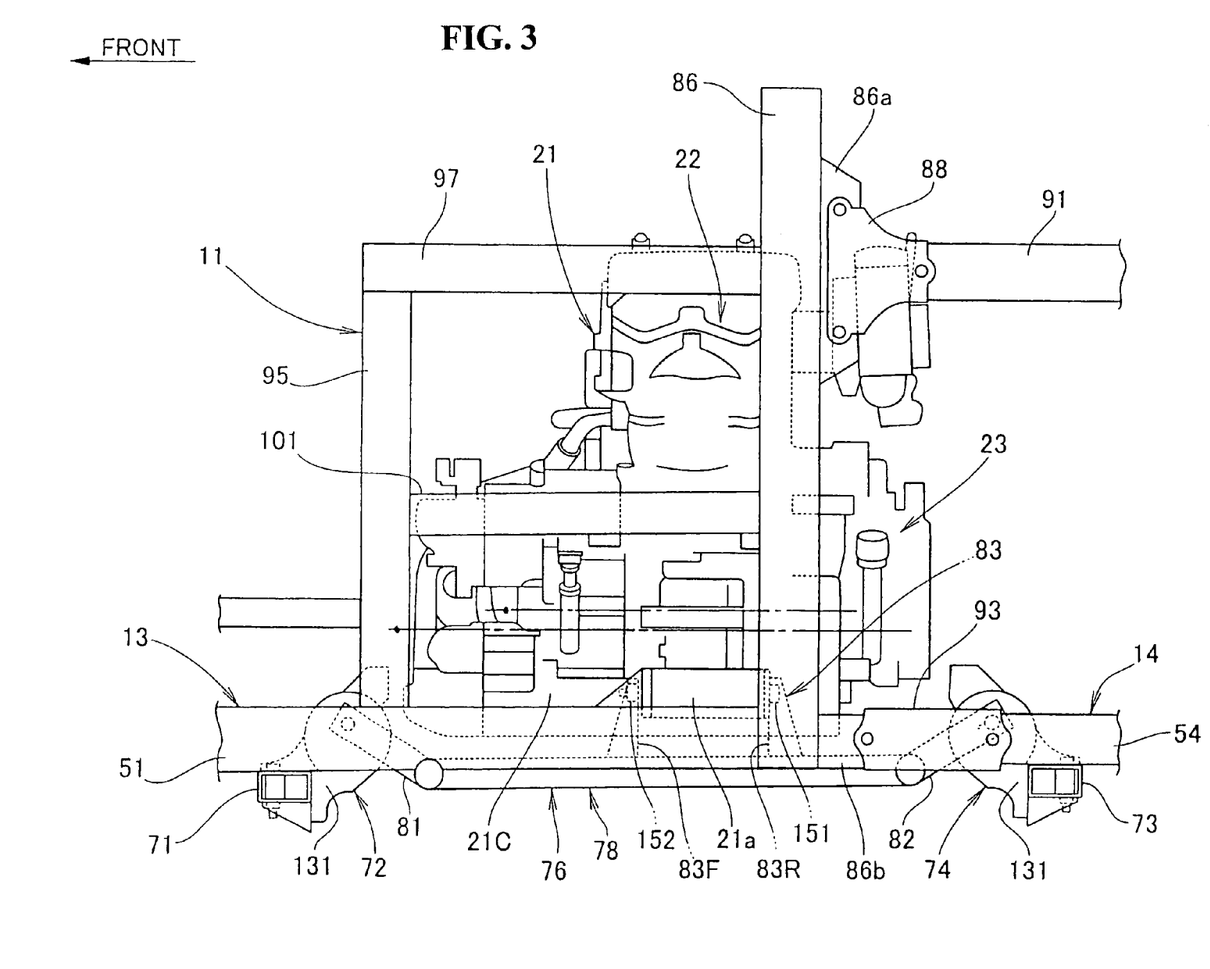
FIG. 3 is a side elevational view showing a principal part of the power unit support structure according to the preferred embodiment of the present invention.

FIG. 3 is a side elevational view showing a principal part of the power unit support structure according to the preferred embodiment of the present invention. FIG. 3 shows the following arrangements. Specifically, a front cross member 71 is mounted on a lower surface of each of the right and left center side frames 51, 51 (only reference numeral 51 representing the center side frame on the proximal side is shown) of the center frame 13, so that the front cross member 71 extends across the center side frames 51, 51. An engine mount 72 is attached to the front cross member 71. A rear cross member 73 is mounted on a lower surface of each of the right and left rear side frames 54, 54 (only reference numeral 54 representing the rear side frame on the proximal side is shown) of the rear frame 14, so that the rear cross member 73 extends across the rear side frames 54, 54. An engine mount 74 is then attached to the rear cross member 73. A subframe 76 is attached to these engine mounts 72, 74. The power unit 21 is mounted to the subframe 76.

Though sharing the same construction, the engine mounts 72, 74 are identified by the different reference numerals for individual identification.

The subframe 76 includes a frame main body 78, extension portions 81, 82, and right and left upright portions 83, 84 (only reference numeral 83 representing the upright portion on the proximal side is shown). The extension portions 81, 82 extend obliquely upwardly from a front and rear end of the frame main body 78. The upright portions 83, 84 stand upright on the right and left sides of the frame main body 78. The extension portion 81 is mounted to a front side of the engine mount 72 and the extension portion 82 is mounted on a rear side of the engine mount 72. Sideward protruded portions 21a, 21b (only reference numeral 21a representing the sideward protruded portion on the proximal side is shown) included in the power unit 21 are attached to the upright portions 83, 84.

The vehicle body frame 11 includes a pair of right and left main vertical frames 86, 87 (only reference numeral 86 representing the main vertical frame on the proximal side is shown), a pair of right and left rear side upper frames 91, 92 (only reference numeral 91 representing the rear side upper frame on the proximal side is shown), and the above-referenced rear side frames 54, 54. The main vertical frames 86, 87 are extended upwardly from rear end portions of the center side frames 51, 51. The rear side upper frames 91, 92 are connected, via brackets 88, 88 (only reference numeral 88 representing the bracket on the proximal side is shown), to upper protruded portions 86a, 87a (only reference numeral 86a representing the upper protruded portion on the proximal side is shown), respectively, of the main vertical frames 86, 87. The above-referenced rear side frames 54, 54 are connected, via brackets 93, 93 (only reference numeral 93 representing the bracket on the proximal side is shown), to lower portion protruded portions 86b, 87b (only reference numeral 86b representing the lower portion protruded portion on the proximal side is shown), respectively, of the main vertical frames 86, 87.

FIG. 3 also illustrates sub-vertical frames 95, 96 (only reference numeral 95 representing the sub-vertical frame on the proximal side is shown), upper frames 97, 98 (only reference numeral 97 representing the upper frame on the proximal side is shown), and middle frames 101, 102 (only reference numeral 101 representing the middle frame on the proximal side is shown).

Figure 4:
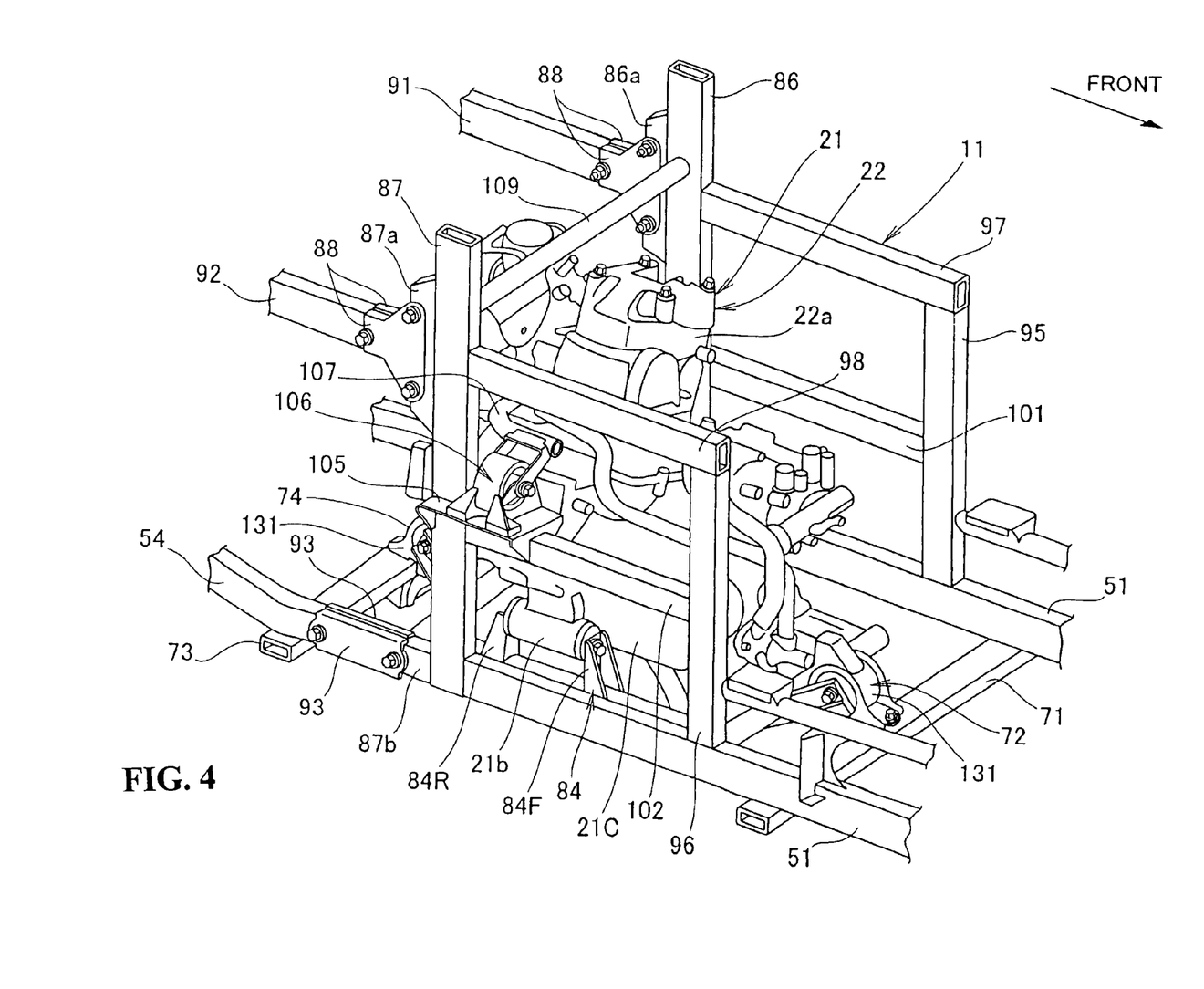
FIG. 4 is a perspective view showing a principal part of the power unit support structure according to the preferred embodiment of the present invention.

FIG. 4 is a perspective view showing a principal part of the power unit support structure according to the preferred embodiment of the present invention. FIG. 4 shows the following arrangements. Specifically, a support base 105 is mounted on the main vertical frame 87 and middle frame 102 forming part of a right side surface of the vehicle body frame 11. An engine mount 106 for receiving a torque reaction force of the power unit 21 is mounted on the support base 105. The engine mount 106 is then mounted via a bracket 107 to the power unit 21, more specifically, to a cylinder portion 22a of the engine 22. Reference numeral 109 represents an upper cross pipe disposed across the main vertical frames 86, 87.

The upright portion 84 includes a front upright portion 84F and a rear upright portion 84R.

The engine mount 106 has the same basic arrangement as that of the aforementioned engine mounts 72, 74.

Figure 5:
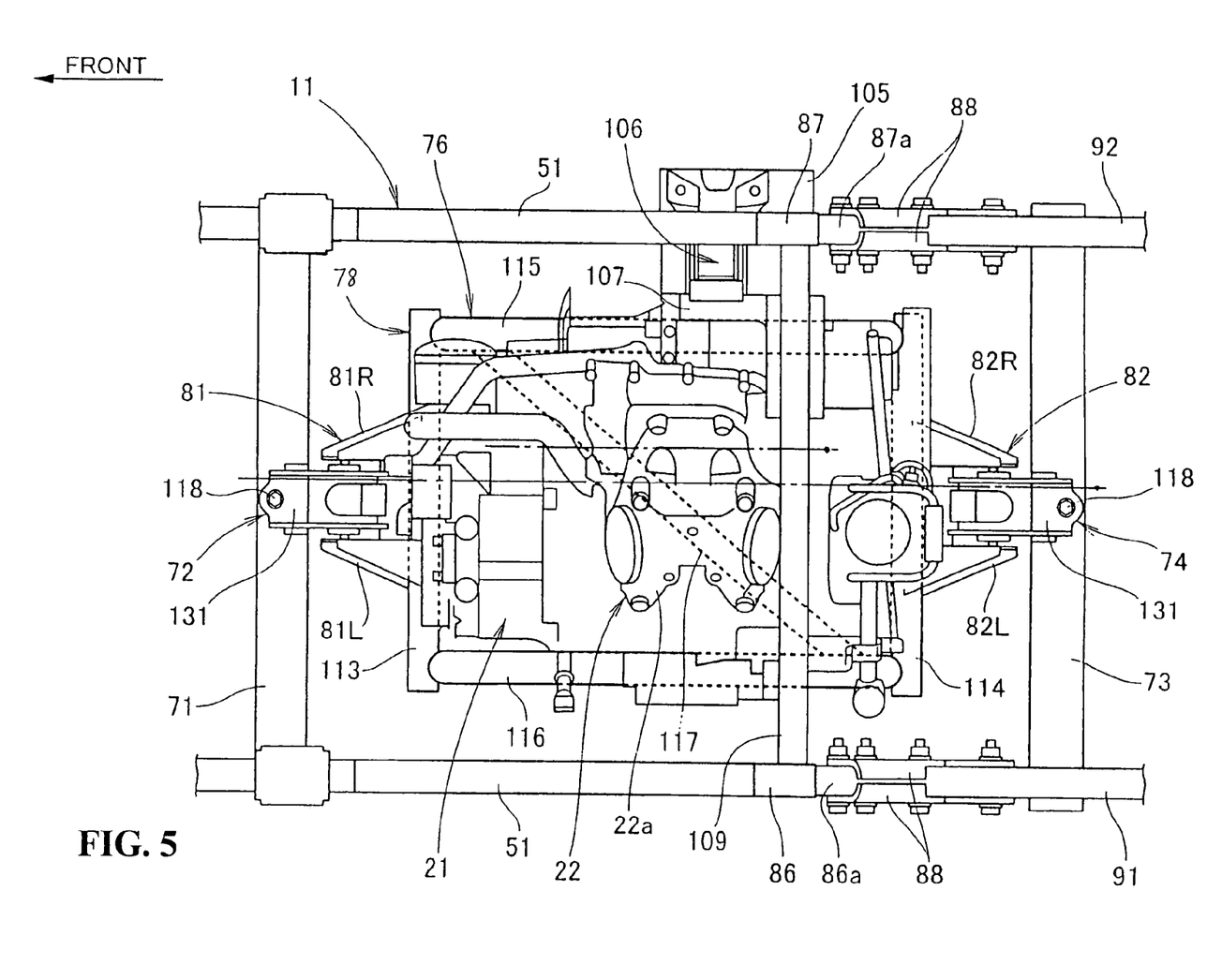
FIG. 5 is a plan view showing a principal part of the power unit support structure according to the preferred embodiment of the present invention.

FIG. 5 is a plan view showing a principal part of the power unit support structure according to the preferred embodiment of the present invention. The subframe 76 is disposed substantially at a center between the right and left center side frames 51, 51. A frame main body 78 (shown by a heavy line in FIG. 5) is formed from four frame members 113 through 116 with a frame member 117 disposed obliquely across the frame members 115 and 116. The extension portions 81 are fitted to the frame member 113 and extension portions 82 are fitted to the frame member 114. Reference numeral 110 represents a straight line that passes through a center of gravity (not shown; to be described in detail later) of the power unit 21 and extends in the fore and aft direction of the vehicle. Reference numeral 118 represents bolts for mounting the engine mounts 72, 74 to the front cross member 71 and the rear cross member 73, respectively. Reference numeral 119 represents an axis of a crankshaft (not shown).

The extension portion 81 includes a left extension portion 81L and a right extension portion 81R that support the engine mount 72 so as to clamp the same from right and left sides.

The extension portion 82 includes a left extension portion 82L and a right extension portion 82R that support the engine mount 74 so as to clamp the same from right and left sides.

Figure 6:
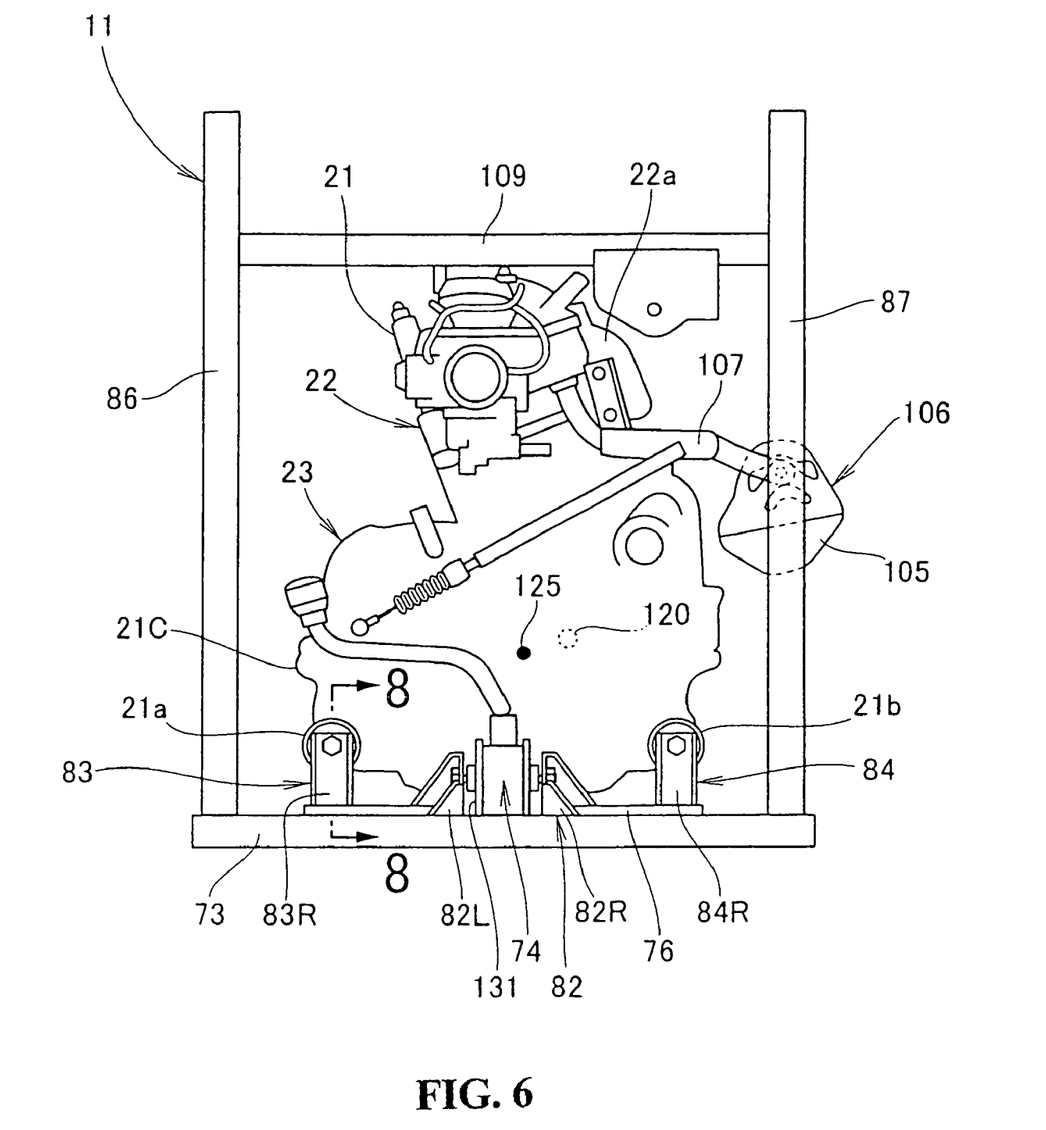
FIG. 6 is a rear elevational view showing a principal part of the power unit support structure according to the preferred embodiment of the present invention.

FIG. 6 is a rear elevational view showing a principal part of the power unit support structure according to the preferred embodiment of the present invention. FIG. 6 shows the following arrangements. Specifically, the engine mounts 72, 74 (only reference numeral 74 representing the engine mount on the proximal side is shown) are disposed substantially at the center in the vehicle width direction (crosswise direction in FIG. 6) of the vehicle body frame 11. The engine mounts 72, 74 elastically support the subframe 76. The upright portions 83, 84 (only reference numeral 84 representing the upright portion on the proximal side is shown) are disposed on right and left sides of the subframe 76. Right and left lower portions (sideward protruded portions 21a, 21b) of the power unit 21 are mounted to the upright portions 83, 84. The engine mount 106 is mounted on the support base 105 disposed on the vehicle body frame 11. The engine mount 106 is then mounted to an upper portion of the power unit 21 via the bracket 107, i.e., the cylinder portion 22a of the engine 22.

Referring to FIG. 6, reference numeral 120 represents the crankshaft of the engine 22 and reference numeral 125 represents the center of gravity of the power unit 21.

Figure 7A:
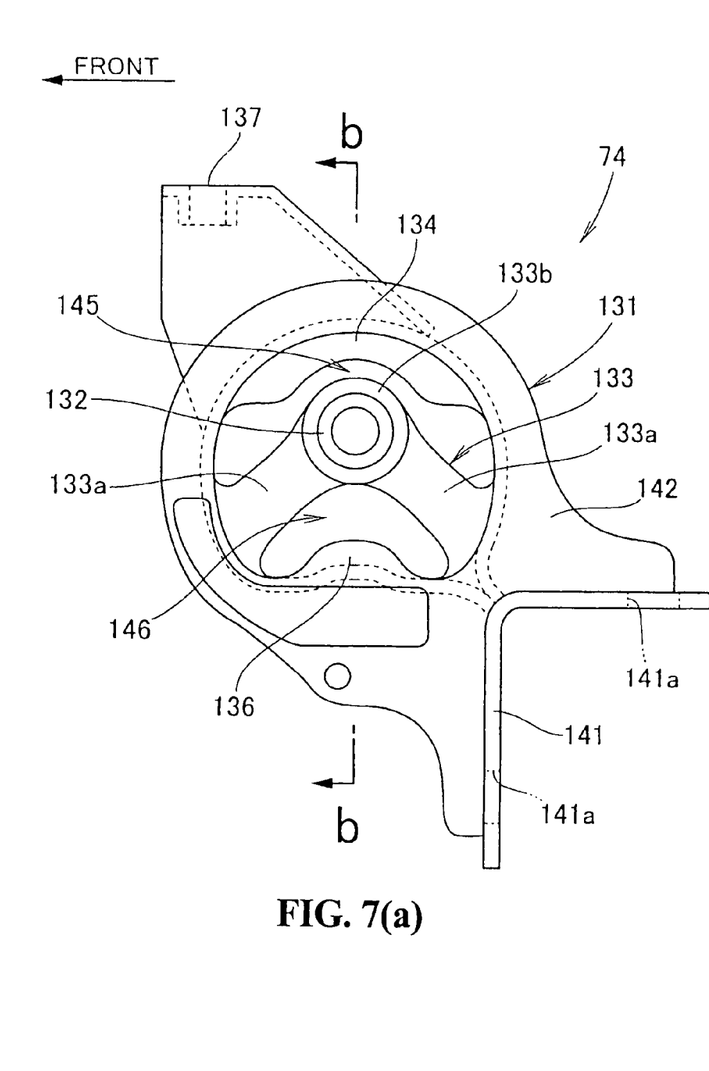
FIGS. 7(a) and 7(b) are views for illustrating the engine mount according to the preferred embodiment of the present invention.
Figure 7B:
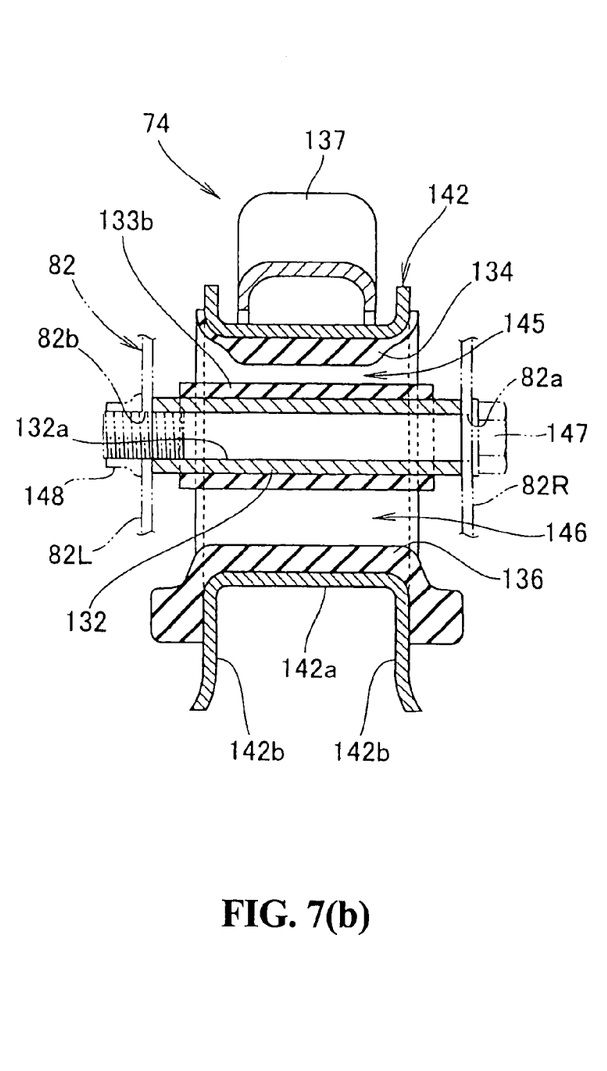

FIGS. 7(a) and 7(b) are views for illustrating the engine mount according to the preferred embodiment of the present invention.

FIG. 7(a) is a side elevational view showing the engine mount 74. The engine mount 74 includes a mount bracket 131, an inner tube 132, a connection member 133, an upper portion protruded portion 134, a lower portion protruded portion 136, and an upper portion member 137. The mount bracket 131 made of a steel plate is attached on the side of the rear cross member 73 (see FIG. 3). The inner tube 132 made of steel is attached to the side of the extension portion 82 (see FIG. 3). The connection member 133 formed from an elastic member is disposed between the mount bracket 131 and the inner tube 132. The upper portion protruded portion 134 and the lower portion protruded portion 136, both formed from an elastic member, are protruded from an upper portion and a lower portion, respectively, of an inner surface of the mount bracket 131. The upper portion member 137 made of steel plate is attached to an upper portion of the mount bracket 131.

The engine mount 74 may be a liquid sealed mount.

The mount bracket 131 includes a base bracket 141 and an outer tube 142. The base bracket 141 having an L shape in a side view is mounted to the rear cross member 73. The outer tube 142, substantially of a cylindrical form, is mounted to the base bracket 141. Reference numerals 141a, 141a are mounting holes through which bolts for fixing the rear cross member 73 are passed.

The connection member 133 includes L shaped two connection bodies 133a, 133a connecting the outer tube 142 with the inner tube 132. An end portion of each of the connection bodies 133a, 133a forms an annular portion 133b covering an outer peripheral surface of the inner tube 132. It is preferable that rubber be used for the material of the connection member 133.

The upper portion protruded portion 134 functions to lessen an impact of collision of the annular portion 133b when the inner tube 132 moves upward relative to the outer tube 142. Rubber should preferably be used for the material of the upper portion protruded portion 134.

The lower portion protruded portion 136 functions to lessen an impact of collision of the annular portion 133b when the inner tube 132 moves downward relative to the outer tube 142. Rubber should preferably be used for the material of the lower portion protruded portion 136.

The connection member 133, the upper portion protruded portion 134, and the lower portion protruded portion 136 are molded through bonding with the inner tube 132 and the outer tube 142 that takes place simultaneously with vulcanization.

FIG. 7(b) is a cross-sectional view taken along line b-b of FIG. 7(a). There is a gap 145 present between the annular portion 133b of the connection member 133 (see FIG. 7(a)) and the upper portion protruded portion 134. There is a gap 146 present between the annular portion 133b and the lower portion protruded portion 136.

The outer tube 142 includes an annular wall 142a and flange portions 142b, 142b integrally formed together. The flange portions 142b, 142b rise from either end of the annular wall 142a.

The engine mount 74 is mounted to the extension portion 82 (the left extension portion 82L and the right extension portion 82R) as follows. Specifically, the left extension portion 82L and the right extension portion 82R are pressed against an end face of the inner tube 132. A mounting bolt 147 is then passed through a bolt insertion hole 82a in the right extension portion 82R, a hollow portion 132a in the inner tube 132, and a bolt insertion hole 82b in the left extension portion 82L. The mounting bolt 147 is then screwed into a nut 148.

Figure 8:
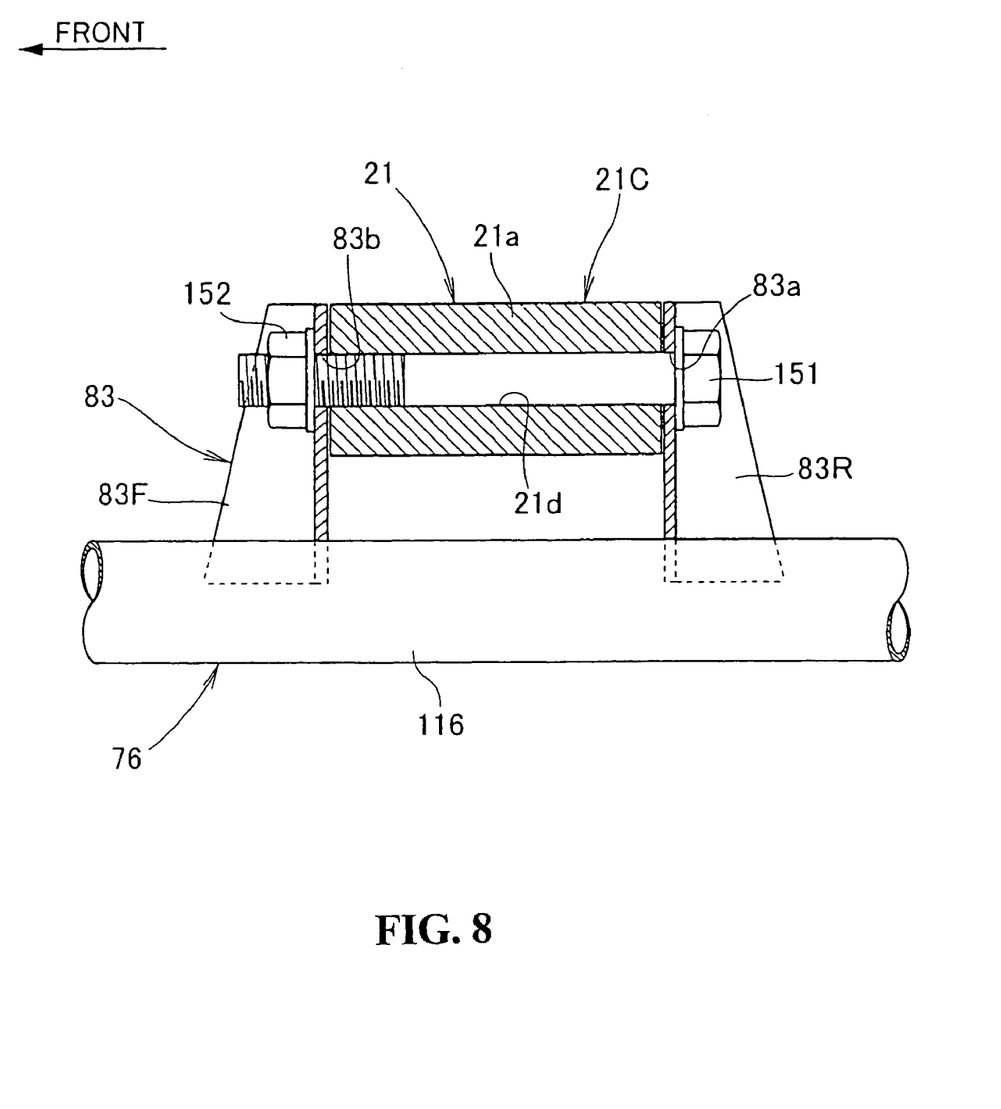
FIG. 8 is a cross-sectional view taken along line 8-8 of FIG. 6.

FIG. 8 is a cross-sectional view taken along line 8-8 of FIG. 6. FIG. 8 shows the structure for mounting the power unit 21 to the subframe 76. Specifically, the upright portion 83 is mounted to the frame member 116 of the subframe 76. The sideward protruded portion 21a integrated with a crankcase 21C of the power unit 21 is disposed between a front upright portion 83F and a rear upright portion 83R that make up the upright portion 83. A bolt 151 is passed through a bolt insertion hole 83a drilled in the rear upright portion 83R, a bolt insertion hole 21d drilled in the sideward protruded portion 21a, and a bolt insertion hole 83b drilled in front upright portion 83F. The bolt 151 is then screwed into a nut 152. Similarly, the sideward protruded portion 21b (see FIG. 6) of the power unit 21 is mounted to the upright portion 84 (see FIG. 6) mounted on the frame member 115 (see FIG. 5) of the subframe 76 in the same manner. This completes mounting of the power unit 21 to the subframe 76.

As described in the foregoing, coupling the sideward protruded portions 21a, 21b of the power unit 21 to the upright portions 83, 84 of the subframe 76 allows the power unit 21 to be integrally supported with the subframe 76. As a result, the subframe 76 and the power unit 21 are vibrated integrally.

Operation of the engine mount described heretofore will be described below.

Figure 9A:
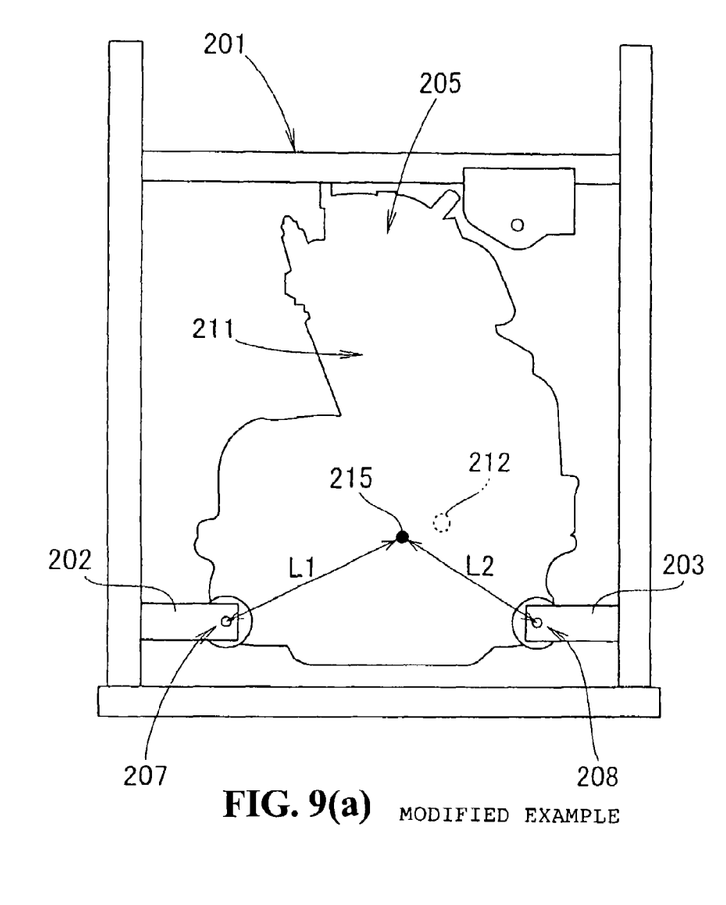
FIGS. 9(a) and 9(b) are views for illustrating the operation of the engine mount.
Figure 9B:
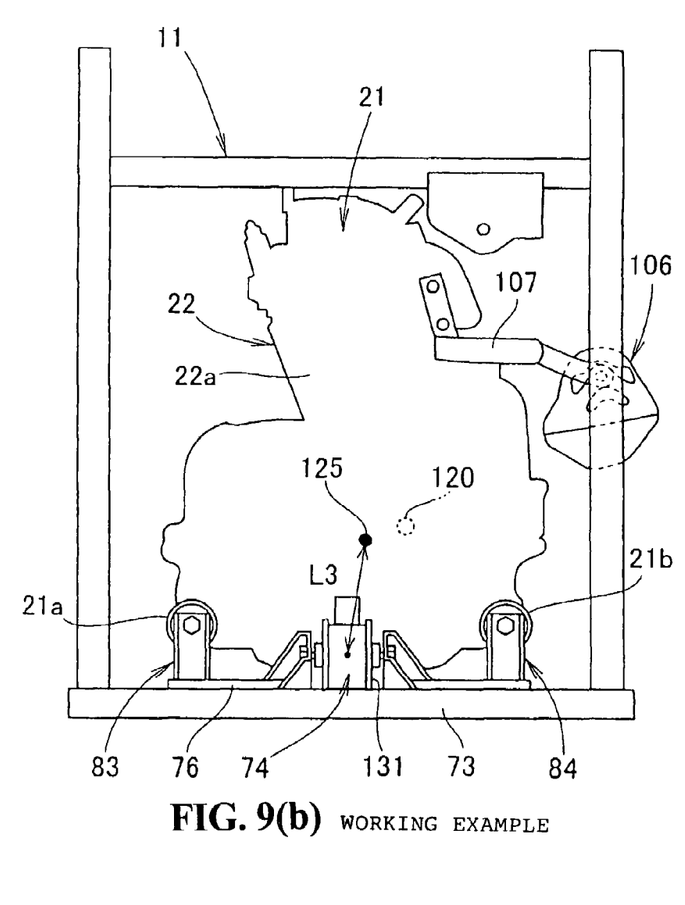

FIGS. 9(a) and 9(b) are views for illustrating the operation of the engine mount.

FIG. 9(a) is a view showing a modified example, in which support brackets 202, 203 are directly mounted to a vehicle body frame 201 and a lower portion of a power unit 205 is mounted to the support brackets 202, 203.

Assume that a distance from each of connection portions 207, 208 between the support brackets 202, 203 and the power unit 205 to a center of gravity 215 is L1 and L2. If the power unit 205 rotationally vibrates about, for example, the center of gravity 215 as a result of rotation of a crankshaft 212 of an engine 211 forming part of the power unit 205, the connection portions 207, 208 displace greatly because of a large distance L1, L2. This results in the vehicle body frame 201 being largely vibrated.

In a working example (the preferred embodiment of the present invention) shown in FIG. 9(b), a distance L3 between the center of gravity 125 of the power unit 21 and the engine mount 74 (a central point of the engine mount 74 is indicated by a black dot) is smaller than the distance L1, L2 shown in FIG. 9(a). Accordingly, even if the power unit 21 rotationally vibrates about the center of gravity 125, the power unit 21 is displaced only a small amount on the engine mount 74. Specifically, the subframe 76 is displaced only a small amount. This results in an even smaller vibration being transmitted from the subframe 76 to the rear cross member 73, i.e., to the vehicle body frame 11, via the engine mount 74.

As described above with reference to FIG. 6, the power unit support structure having the mount bracket 131 as the support bracket disposed on the vehicle body frame 11, the mount bracket 131 supporting the power unit 21 including the longitudinal engine 22, is characterized in that the mount bracket 131 is disposed substantially at the center in the vehicle width direction between the center side frames 51, 51 as the pair of right and left main frames forming part of the vehicle body frame 11 and extending in the vehicle fore and aft direction.

Disposing the mount bracket 131 substantially at the center in the vehicle width direction between the pair of right and left center side frames 51, 51 allows the mount bracket 131 to be disposed at a point near the center of rotational vibration of the power unit 21. The mount bracket 131 is therefore able to support the power unit 21 at a location of small displacement. This helps prevent vibration from being transmitted from the power unit 21 to the vehicle body frame 11.

As described above with reference to FIGS. 6, 9(a), and 9(b), in accordance with the second aspect of the present invention, the power unit support structure having the mount bracket 131 disposed on the vehicle body frame 11, the mount bracket 131 supporting the power unit 21 including the longitudinal engine 22, is characterized in that the mount bracket 131 is disposed between the pair of right and left center side frames 51, 51 forming part of the vehicle body frame 11 and extending in the vehicle fore and aft direction and at a point near the center of gravity 125 of the power unit 21.

Disposing the mount bracket 131 between the pair of right and left center side frames 51, 51 and at the point near the center of gravity 125 of the power unit 21 allows the mount bracket 131 to be disposed at a point even closer to the center of rotational vibration of the power unit 21. The power unit 21 can thereby be supported at a location of small displacement. Vibration of the vehicle body frame 11 can be made even smaller.

As described above with reference to FIGS. 6 and 7(a), in accordance with the third aspect of the present invention, the power unit support structure is characterized in that the mount bracket 131 is mounted to the side of the power unit 21 via the connection member 133 as the vibration damping material.

The connection member 133 can absorb vibration of the power unit 21, which helps make vibration of the vehicle body frame 11 even smaller.

As described above with reference to FIG. 5, in accordance with the fourth aspect of the present invention, the power unit support structure is characterized in the following arrangements. Specifically, the pair of right and left center side frames 51, 51 is connected with cross members (the front cross member 71 and the rear cross member 73). The mount bracket 131 is attached to each of these cross members 71, 73. The subframe 76 as the power unit support subframe is mounted to the mount brackets 131 via the rubber connection member 133 as the vibration damping material. The power unit 21 is then mounted on the subframe 76.

According to these arrangements, the subframe 76 allows the power unit 21 to be disposed easily substantially at the center in the vehicle width direction. The power unit 21 can thereby be supported at a location with a small displacement. Vibration of the vehicle body frame 11 can thereby be minimized. In addition, the mount of the foregoing system can be adopted by way of the subframe 76 even with the conventional longitudinal engine.

Use of the subframe 76 helps minimize restrictions imposed by the size of the power unit 21 and the positions of the center side frames 51, 51, thus increasing the degree of freedom in design of the mount bracket 131. Moreover, vibration, which could otherwise be transmitted from the subframe 76 to the right and left center side frames 51, 51 and to the vehicle body frame 11, can be absorbed by the rubber connection member 133.

As described above with reference to FIG. 6, in accordance with the fifth aspect of the present invention, the power unit support structure is characterized in that the engine mount 106 as the power unit support portion supporting the power unit 21 is disposed at a position offset in the height direction relative to the mount bracket 131.

Disposing the engine mount 106 at the position offset in the height direction relative to the mount bracket 131 allows the engine mount 106 to receive the torque reaction force of the power unit 21. Support stiffness for the power unit 21 can thereby be enhanced.

As described above with reference to FIG. 5, in accordance with the sixth aspect of the present invention, the power unit support structure is characterized in that the mount bracket 131,131 is mounted to the subframe 76 via the extension portions 81, 82.

The mount bracket 131,131 is mounted to the subframe 76 via the extension portions 81, 82. The extension portions 81, 82 make it possible to mount the mount bracket 131 at a position on the subframe 76, at which the mount bracket 131 does not interfere with the power unit 21. This enhances assemblability.

According to the preferred embodiment of the present invention, the engine mount 106 is attached on the right-hand side of the vehicle body frame 11 as shown in FIG. 6. The embodiment is not limited to this arrangement and the engine mount 106 may be mounted on the left-hand side of the vehicle body frame 11.

In addition, as shown in FIG. 8, the sideward protruded portions 21a, 21b (only reference numeral 21a representing the sideward protruded portion on the proximal side is shown) are mounted to the upright portions 83, 84 (only reference numeral 83 representing the upright portion on the proximal side is shown) of the subframe 76 using the bolt 151. The embodiment is not limited to this arrangement and an elastic member each may be interposed between the sideward protruded portion 21a and the bolt 151, and between the sideward protruded portion 21b and the bolt 151, so that the power unit 21 is elastically supported relative to the subframe 76.

The power unit support structure according to the preferred embodiment of the present invention is preferably applicable to a four-wheeled vehicle and includes an arrangement, in which the structure is mounted with no subframes interposed by providing brackets at a front end and a rear end of the longitudinal engine.

What is claimed is:

1. A power unit support structure comprising:
   a vehicle body frame including front and rear cross members extending between right and left main frames which extend in a vehicle fore and aft direction;
   a power unit support subframe upon which a power unit including a longitudinal engine is mounted;
   a front support bracket and a rear support bracket which are directly attached, respectively, to the front and rear cross members in order to mount the power unit support frame onto the vehicle body frame,
   wherein the front and rear support brackets are disposed substantially at a center in a vehicle width direction between the right and left main frames,
   wherein the power unit support subframe is supported on the vehicle body only in the vehicle fore and aft direction, and
   wherein the power unit support subframe is rectangular-shaped and includes front and rear lateral extending members and right and left longitudinal extending members,
   the power unit support structure further comprising:
   a front extension portion projecting forwardly from a central portion of the front lateral extending member beyond the power unit, and
   a rear extension portion projecting rearwardly from a central portion of the rear lateral extending member beyond the power unit,
   wherein the front support bracket connects the front extension portion to a central portion of the front cross member, and the rear support bracket connects the rear extension portion to a central portion of the rear cross member.

2. The power unit support structure according to claim 1, wherein the front and rear support brackets are mounted to a side of the power unit via a vibration damping material.

3. The power unit support structure according to claim 1, wherein a power unit support portion supporting the power unit is disposed at a position offset in a height direction relative to the front and rear support brackets.

4. A power unit support structure having two support brackets directly attached to a vehicle body frame, the two support brackets respectively supporting a front and rear side of a power unit having a crankshaft extending in a vehicle fore and aft direction,
   wherein each of the two support brackets is disposed substantially midway between a pair of right and left main frames forming part of the vehicle body frame and extending in the vehicle fore and aft direction,
   wherein one of the support brackets is disposed at a front of the vehicle body, and the other of the support brackets is disposed at a rear of the vehicle body, and a center of gravity of the power unit is disposed at a point offset to one lateral side of a line extending in a longitudinal direction of the vehicle body frame and connecting the two support brackets at the front and rear of the power unit.

5. The power unit support structure according to claim 4, wherein another bracket is mounted to a side of the power unit via a vibration damping material.

6. The power unit support structure according to claim 4, wherein a power unit support subframe upon which the power unit is mounted is supported on the vehicle body only in the vehicle fore and aft direction.

7. The power unit support structure according to claim 5, wherein a power unit support subframe upon which the power unit is mounted is supported on the vehicle body only in the vehicle fore and aft direction.

8. The power unit support structure according to claim 4, wherein a power unit support portion supporting the power unit is disposed at a position offset in a height direction relative to the two support brackets.

9. The power unit support structure according to claim 5, wherein a power unit support portion supporting the power unit is disposed at a position offset in a height direction relative to the two support brackets.

10. The power unit support structure according to claim 6, wherein a power unit support subframe is rectangular-shaped and includes front and rear lateral extending members and right and left longitudinal extending members,
    wherein one of the two support brackets connects a central portion of the front lateral extending member to a central portion of a front cross member of the vehicle body frame, and the other of the two support brackets connects a central portion of the rear lateral extending member to a central portion of a rear cross member of the vehicle body frame.

11. The power unit support structure according to claim 7, wherein a power unit support subframe is rectangular-shaped and includes front and rear lateral extending members and right and left longitudinal extending members,
    wherein one of the two support brackets connects a central portion of the front lateral extending member to a central portion of a front cross member of the vehicle body frame, and the other of the two support brackets connects a central portion of the rear lateral extending member to a central portion of a rear cross member of the vehicle body frame.

12. The power unit support structure according to claim 4, wherein the two support brackets are mounted to a power unit support subframe via an extension portion.

13. The power unit support structure according to claim 5, wherein the two support brackets are mounted to a power unit support subframe via an extension portion.

* * * * *